United States Patent [19]

Lars

[11] Patent Number: 4,700,959
[45] Date of Patent: Oct. 20, 1987

[54] CHASSIS

[76] Inventor: Eriksson Lars, Storgatan 40, S-361 00 Emmaboda, Sweden

[21] Appl. No.: 736,276

[22] Filed: May 20, 1985

[30] Foreign Application Priority Data

Sep. 30, 1983 [SE] Sweden ............................ 8305359

[51] Int. Cl.⁴ ............................................. B62B 1/00
[52] U.S. Cl. .............................. 280/791 R; 280/785; 52/657; 403/403; 296/29; 108/56.1
[58] Field of Search ............. 280/785, 47.34, 79.1 R, 280/79.1 A; 52/656, 657; 403/402, 403, 205, 231; 296/29, 30; 108/56.1, 56.3, 155; 312/257 SK

[56] References Cited

U.S. PATENT DOCUMENTS

| | | | |
|---|---|---|---|
| 2,473,217 | 6/1949 | Peoples | 403/205 |
| 3,062,570 | 11/1959 | Schwartz | 403/172 |
| 3,590,753 | 7/1971 | Blink | 108/155 |
| 3,866,380 | 2/1975 | Benson | 52/656 |

FOREIGN PATENT DOCUMENTS

| | | |
|---|---|---|
| 2195280 | 2/1974 | France . |
| 335546 | 9/1930 | United Kingdom . |
| 918012 | 2/1963 | United Kingdom ............. 280/47.34 |
| 975064 | 12/1964 | United Kingdom . |

Primary Examiner—John J. Love
Assistant Examiner—Richard Camby
Attorney, Agent, or Firm—Vinson & Elkins

[57] ABSTRACT

The disclosure relates to a chassis for such a type or trolley, shelf or the like which, as part of a modular system, is used for meeting different transport or storage needs at offices, in workshops or the like and which comprises chassis members which are constructed from a number of perforated square tubes and on which wheels, feet or the like are fixed. According to the disclosure, the chassis has, at its corners, composite structures which are rigid in the spatial plane of extent of the chassis but are yieldable in another direction. The composite structures consist partly of angular connecting pieces which for example consist of rubber and have projections which extend into mutually meeting end portions of the chassis members and partly of plate or disc-shaped joining pieces which are produced from slighlty flexible sheet metal material and are disposed only on the underside of the chassis. The joining pieces have ridges which engage in perforations in the chassis members.

6 Claims, 2 Drawing Figures

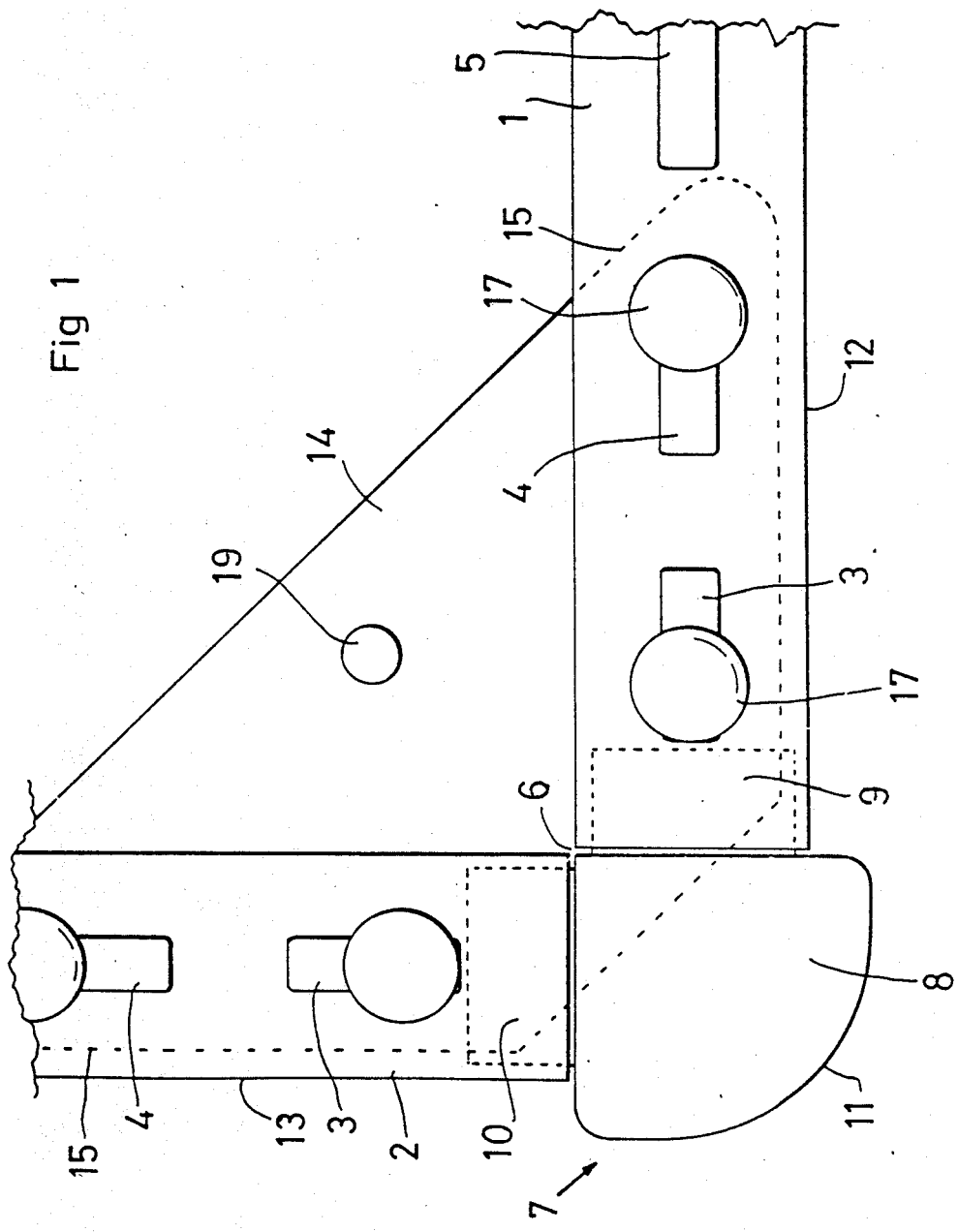

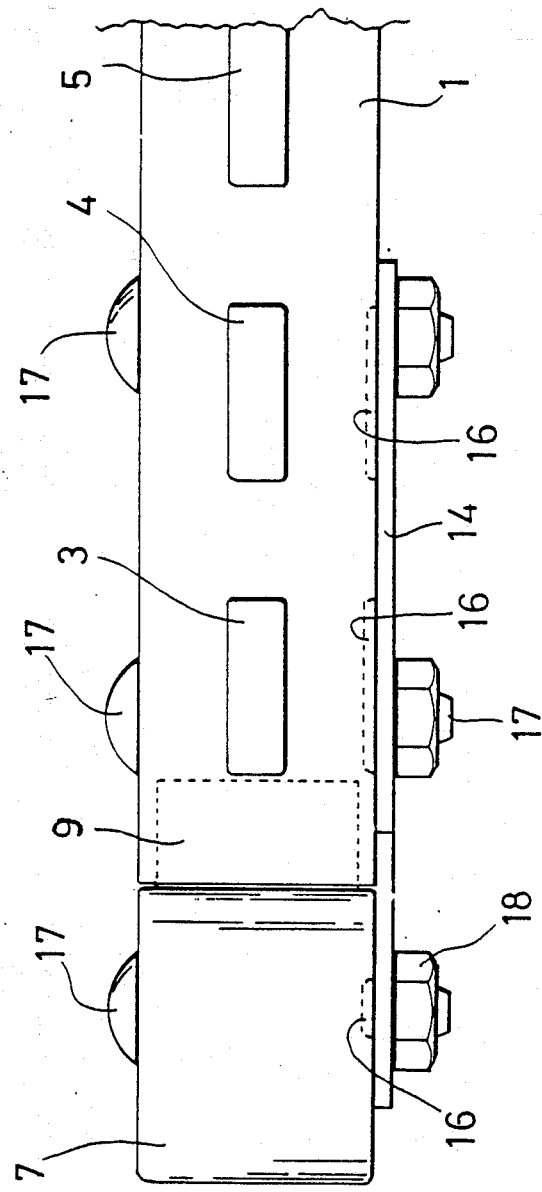

CHASSIS

FIELD OF INVENTION

The present invention relates to a chassis for such a trolley, sled, shelf or the like which, as part of a modular system, is used for meeting various transport and storage needs at offices, workshops, and so on.

BACKGROUND OF INVENTION AND RELATED ART

To cover different transport and storage needs, a wide variety of aids is employed such as trolleys, sleds, trucks, floor-based frames, shelves and so on. Many times, these are not constructed from standard components, and cannot be supplemented with other accessories for optimum flexibility, and maximum economy. Many different variations of such trolleys, trucks, shelves and the like are available on the market today in more or less fully-welded constructions, with the result that they are rigid and inflexible.

In order that a trolley, truck, shelf or the like, of the type intimated above fulfil its function in a completely favourable manner, it is necessary, among other things, that it be very simple and handy in both use and assembly, since it should be built up of a number of standard components which may easily be packed in one compact carton or crate and transported in this way. Furthermore, the trolley, truck or shelf should, naturally, possess requisite stability so as not to seem unsteady or uncomfortable to use, while at the same time it is often necessary that the trolley, truck, shelf or the like be moved across or stand on quite uneven surfaces and floors, without tipping or rocking and without creating, on movement, more noise than is absolutely necessary.

The chassis of prior art trolleys, trucks, shelves or the like have often been welded together as completely rigid units, which has int. al. entailed the drawback that the noise pollution level on propulsion across uneven ground is rather high, at the same time as they cannot, naturally, be readily transported in dismantled condition in order to be simply assembled at the place of use.

OBJECTIVES AND STATEMENT OF THE INVENTION

Thus, the object of the present invention is to realise a chassis for a trolley, truck or shelf of the type disclosed by way of introduction, the chassis being designed in such a manner as simply and readily to be assembled on the basis of easily-handleable standard components and so as, moreover, to give satisfactory stability while, this notwithstanding, allowing for smooth running over or placing on an uneven substrate.

This object is achieved according to the present invention by means of a chassis which comprises a number of chassis members on which wheels, feet, skids or the like and a superstructure may be disposed, and is characterised in that mutually meeting chassis members are interconnected by connection and jointing members which are designed to be rigid approximately in the spatial plane of extent of the chassis, but which are yieldable in another direction.

A further suitable feature according to the present invention is that the corner regions of mutually meeting chassis members are in engagement with angular connection pieces of elastic or yieldable material and that there is disposed, on the one face, preferably the underface, of one such corner region, a plate or disc-shaped jointing piece which is flexible or deformable to a certain degree and which connects the chassis members with one another.

As a rule, the chassis according to the present invention may be substantially rectangular and be composed of chassis members consisting of perforated square tubes. In one such embodiment, it is a further suitable feature according to the present invention that the jointing pieces are provided with ridges which are insertable in the perforations of the chassis members, whereby the chassis is rigid in directions in its own spatial plane of extent, but yieldable in other directions.

The subject matter of the present invention is further suitably characterised in that the connection pieces have projections making angles with one another, the projections being disposed in end portions on chassis members meeting in one corner of the chassis.

To permit simple and uncomplicated assembly of the chassis, the subject matter of the present invention is further suitably characterised in that the chassis members and jointing pieces are interconnected by means of anchorage devices which extend through openings in the jointing pieces and through the perforations of the chassis members.

To ensure a sufficiently high degree of stability in the corner regions of the chassis, a further characterising feature of the present invention is that there is disposed, interiorly in meeting end portions of the chassis members, spacer or support devices which prevent deformation of the chassis members on tightening of the anchorage devices.

BRIEF DESCRIPTION OF THE ACCOMPANYING DRAWINGS

The nature of the present invention and its aspects will be more readily apparent from the following brief description of the accompanying Drawings, and discussion relating thereto.

In the accompanying Drawings:

FIG. 1 is a top plan view of a corner region of a chassis embodied according to the present invention; and FIG. 2 is a side elevation of the same corner region.

DESCRIPTION OF PREFERRED EMBODIMENT

FIG. 1 illustrates two chassis or frame members 1 and 2 which are included in a rectangular chassis and meet one another at substantially a right angle. In this illustrated embodiment, these chassis members comprise tubular parts of rectangular, or preferably square cross section. All four sides of these chassis members are perforated at 3, 4, and 5 on the Drawing. As is apparent from the Drawing figure, these perforations may be approximately rectangular, but may just as well be rounded-off.

Even though the employment of perforations is a ready solution according to the present invention, alternatives without such perforations are conceivable, accessory equipment being mounted on the chassis in some other manner, for example, by clamp connections, snap connections, by drilling and screwing, or by someother suitable means.

The chassis or frame members 1 and 2 are disposed, at their meeting ends, in spaced apart relationship 6, whereby a limited freedom of movement between the chassis members 1 and 2 may be permitted without giving rise to screening or squeeking between the various parts.

For joining together the mutually meeting ends of the chassis members 1 and 2, use is made of a connecting piece 7 which, in the illustrated embodiment, may suitably consist of relatively hard rubber, plastic material or the like and which may possess a certain degree of inherent elasticity or yieldability. The connecting piece has two pins 9 and 10 projecting at a right angle from a corner portion 8, and being of a design which is complementary to the internal construction of the end portions of the chassis members 1 and 2, and which are inserted in the chassis members with as tight fit as possible.

The corner portion 8 of the connecting piece 7 serves, apart from the simple purpose of joining, also the purpose of constituting a buffer or fender if the trolley or the like were to be run against a fixed object, furniture, a wall etc. For this reason, the corner portion 8 has a gently rounded contour 11 which extends beyond the outer sides 12 and 13, respectively, of the chassis members 1 and 2.

The present invention may also be realised without the use of the connecting piece 7. In such a case, the chassis members 1 and 2 may be mitred at the corners or overlap. Furthermore, resiliently yieldable corner elements of, for example, metal may, naturally, also be used.

To ensure that the chassis remain rigid in its own spatial plane of extent, use is made, at each corner region, of joining pieces 14, preferably disposed on the underside of the chassis, the hidden contour of this piece being intimated by ghosted lines 15 in FIG. 1. As will be apparent from this Drawing figure, the joining piece approximates, in appearance, a trapezium, but may, naturally, also be approximately triangular, rectangular or be of any other suitable configuration, and consists of panelled material of sheet metal, plastic or the like of such thickness as renders it capable of guaranteeing sufficient rigidity as regards preventing changes to the angles between the chassis members in the spatial plane of extent of the chassis, but, this notwithstanding, guarantees a certain freedom of movement to the chassis members in other directions, primarily the vertical. As a result of this design, choice of materials and dimensions of the joining piece 14, the finished chassis may, thus, to some extent be twisted and resiliently yield if one of the wheels or feet of the chassis, which are preferably placed beneath the corner regions of the chassis, were to stand upon or ride over a crest or ridge, whereby good contact is still maintained with the substrate.

To prevent changes in the angles between the chassis members, the joining piece 14 is provided with projections 16, as intimated by ghosted lines in FIG. 2, which fit into the perforations on the undersides of the chassis members 1 and 2. Furthermore, the joining piece 14 is held fixedly urged against and connected to the chassis members by means of anchorage devices which, in practice, may suitably consist of screws 17 and corresponding self-locking nuts 18. To prevent deformation and crushing of the chassis members 1 and 2 on tightening of these screws, there are disposed interiorly within the chassis members spacer and filler devices (not shown on the Drawings) which may be in the form of U-shaped bent sheet metal strips which have been dimensioned in such a manner that they may be inserted interiorly in the chassis members and grasp about the screws 17. Suitably, the length of the shanks of one such U-shaped spacer may be such that one and the same spacer can provide rigidifying support beneath at least two screws 17 located in adjacent perforations 3 and 4.

In one alternative, both the connecting pieces 7 and the joining pieces may be replaced by other constructional elements which cooperate in such a manner with the chassis members 1 and 2 that their mutual, preferably right, angles in the corners are assured, at the same time as freedom of movement in a vertical direction between the chassis members is guaranteed. One such a constructional element may consist of an angle iron which is inserted and locked in the ends of the chassis members. Possibly, two such angle irons may be used with spacers between, in which case the gap between the spacers may be filled with an elastic or yieldable material.

As is apparent from FIG. 1, the joining piece 14 may suitably serve for the anchorage of wheels, rails, skids, feet or the like beneath the chassis and, to this end, be provided with a suitable anchorage hole 19. Naturally, such wheels, feet etc. may also be anchored direct in the chassis members.

Because of the absence of rigid connections between the chassis members which make up the chassis, these can, to a certain degree, move or yield in relation to one another, such that, as a result, the chassis in its entirety can be propelled over or placed on a non-planar or otherwise uneven or pitted surface. In such movements in the chassis, the connecting piece 7 will be deformed and function as a resilient spring body together with the joining piece 14 which, as was mentioned above, is manufactured from some form of sheet metal material, possibly spring steel. Since the joining piece 14 has large extent in the spatial plane of extent of the chassis, and since the joining piece cannot be twisted in relation to the chassis members in its own plane and in the spatial plane of extent of the chassis in its entirety, the chassis will be rigid in this direction but, on the other hand, resiliently yieldable in other directions so that, for example, one wheel may be raised at the same time as the three remaining wheels rest even on a planar substrate.

The invention should not be considered as restricted to that described above and shown on the Drawings, many modifications being possible without departing from the spirit and scope of the appended claims.

What is claimed is:

1. A chassis comprising:
a plurality of elongate frame member means arranged in angular relationship in a plane of extent and providing corners in said chassis,
joining piece means at said corners positioning said frame member means relative to each other,
support means on one of said frame member means and joining piece means for supporting said chassis,
said joining piece means being plate-shaped and extending parallel to said plane of extent and rigidly connected directly to mutually adjacent frame member means,
said frame member means having gaps between mutually adjacent frame member means to permit relative movement between adjacent frame member means,
said joining piece means being rigid in said plane of extent and flexible other than in said plane of extent to allow said frame member means to move relative to each other in any direction other than in said plane of extent to permit each of said support means to engage an uneven surface and support said chassis.

2. The chassis of claim 1, wherein angular connection piece means made from yieldable material engage said frame member means at said corners and provide bumpers, and said joining piece means are arranged above or below the frame member means.

3. The chassis of claim 2, wherein said frame member means are provided with spaced perforations, and said joining piece means have projections received in said perforations to prevent changes in the angle between frame member means.

4. The chassis of claim 2, wherein said connection piece means have projections formed at angles to each other and mating with the frame member means at said corners.

5. The chassis of claim 3, wherein said connection piece means have projections formed at angles to each other and mating with the frame member means at said corners.

6. The chassis according to claim 1, 2, 3, 4, or 5, wherein said frame member means are hollow tubes with perforations extending therethrough, said frame member means and joining piece means are connected to each other by fastening means extending through openings in said joining piece means and the perforations in said frame member means, and spacers are provided internally of said frame member means in the region of said fastening means to prevent deformation of said frame member means.

* * * * *